United States Patent
Wojtalewicz et al.

[11] Patent Number: 5,885,055
[45] Date of Patent: Mar. 23, 1999

[54] COLLATION ASSEMBLIES

[75] Inventors: Frank Wojtalewicz, Wiesbaden; Helmut Rapp; Dietrich Thor Straten, both of Rodgau; Gunter Weiss, Offenbach/Bieber; Peter Srostlik, Maintal, all of Germany; Nicholas Lyons, Billingshurst, United Kingdom; Ronald Corbett Wainwright, Uckfield, United Kingdom; Paul John Welfare; Rolf David Mears, both of Redhill, United Kingdom

[73] Assignee: Redland Technologies Limited, United Kingdom

[21] Appl. No.: 605,139

[22] PCT Filed: Sep. 13, 1994

[86] PCT No.: PCT/EP94/03066

§ 371 Date: Jun. 24, 1996

§ 102(e) Date: Jun. 24, 1996

[87] PCT Pub. No.: WO95/08501

PCT Pub. Date: Mar. 30, 1995

[30] Foreign Application Priority Data

Sep. 25, 1993 [GB] United Kingdom .................. 9319854

[51] Int. Cl.[6] .................................................. B65G 57/14
[52] U.S. Cl. ...................................... 414/790.4; 414/793.7
[58] Field of Search ............................ 414/790.2, 790.8, 414/793.7, 794.8

[56] References Cited

U.S. PATENT DOCUMENTS

| 3,921,826 | 11/1975 | Rice et al. |
| 4,712,361 | 12/1987 | Oberoi .............................. 414/793.7 X |
| 4,867,626 | 9/1989 | Oberoi ................................ 414/793.7 |

FOREIGN PATENT DOCUMENTS

| 215900 | 6/1961 | Austria . |
| 0 061 631 A | 10/1982 | European Pat. Off. . |
| 0 173 436 B | 3/1986 | European Pat. Off. . |
| 0 268 438 A | 5/1988 | European Pat. Off. . |
| 25 32 410 | 2/1977 | Germany . |
| 30 17 612 | 11/1981 | Germany . |
| 3736868 | 5/1989 | Germany ........................... 414/793.7 |
| 40 23 234 | 2/1991 | Germany . |
| 630 041 | 5/1982 | Switzerland . |
| 1 552 994 | 9/1979 | United Kingdom . |
| 2 161 149 | 1/1986 | United Kingdom . |

*Primary Examiner*—Janice L. Krizek
*Attorney, Agent, or Firm*—Rothwell, Figg, Ernst & Kurz, P.C.

[57] ABSTRACT

A conveyor-collator assembly for use in forming stacks of articles, e.g. concrete roof tiles (T) at speeds of up to 200 tiles per minute, is provided with a conveyor means (42) by which tiles (T) are fed seriatim to a velocity control means (72) whereby each tile (T) is transferred under "no-load" or substantially "no-load" conditions onto a falling shelf conveyor (140). Tiles (T) held in the conveyor (140) are thereafter deposited onto a support (26–28) of a stack forming means (24) under "no-load" or substantially "no-load" conditions whereby breakages of tiles (T) due to "shock loads" experienced hitherto in prior art arrangements is eliminated. The stack-forming means (24) of the conveyor-collator assembly is arranged with the supports (26, 28) thereof mounted for sequential movement through the same spacial path at rates consistent with ensuring that upon the completion of a stack of tiles (T) on one of said supports (26, 28) at a downstream end of the path the other of said supports (26, 28) is approaching an upstream end of said path for facilitating the stacking of tiles (T) in a subsequent stack thereof.

20 Claims, 12 Drawing Sheets

COLLATION ASSEMBLIES

This invention is concerned with improvements in or relating to collation assemblies, that is, assemblies adapted for use in the collation and stacking of "articles", viz. manufactured building components. The invention is particularly, although not exclusively, concerned with improvements in collation assemblies for use with a concrete roof tile manufacturing plant.

The important steps in the process of concrete roof tile manufacture are the formation of tiles on metal pallets, curing the mortar, depalleting the cured tiles and the packaging of the end product. The main use of collation assemblies is for creating stacks of cured tiles ready for packaging.

In their passage to and through collation assemblies the tiles may be subject to shock loads due to the sudden stop-start conditions under which known collation assemblies have operated. Under such conditions the tiles may suffer damage. Such damage may be obvious from visual inspection, which will enable the damaged tiles to be removed before the tiles are packaged.

However, often the resulting damage is in the form of hairline cracks not visible to the human eye, which cracks only become evident due to handling or exposure to inclement weather conditions in use, and lead to corners breaking off tiles. This obviously leads to loss of goodwill between the manufacture and end-user.

It is therefore an object of this invention to provide an improved collation assembly suitable for use in a tile plant wherein the shock loading on tiles fed to and through the assembly is reduced to a minimum, that is, a "no-load" or substantially "no-load" condition, so that the stacking of tiles may be accomplished at high speed, i.e. up to 200 tiles per minute.

Such an object is met in part by the assemblies disclosed in EPS 0173436 and EPS 0268438; however, the assemblies are cumbersome and difficult to integrate into conventional concrete roof tile plants.

The present invention seeks to mitigate or overcome the disadvantages of the prior art and conveniently provides a collator assembly adapted for use in forming stacks of articles as hereinbefore defined, said assembly comprising a collator having first and second supports and drive means associated with said first and second supports respectively for moving said first and second supports, when the assembly is in use, in turn through the same spacial path, the spacial path comprising an operative run at an upstream end of which, when the assembly is in use, articles are fed seriatim to the collator to form a stack of such articles on the first and second supports in turn, the spacial path also comprising an inoperative run through which, when the assembly is in use, the first and second supports, having successively had a stack of articles removed therefrom at a downstream end of said operative run, are thereafter successively moved by the drive means at a rate commensurate with returning said first or second support to the upstream end of the operative run as the second or first support, having passed through said operative run, approaches the downstream end thereof.

Preferably the drive means comprises at least one endless carrier element for each of the first and second supports respectively and conveniently the drive means comprises two endless carrier elements for each of the first and second supports respectively.

In one preferred embodiment provided by the invention the carrier elements associated with the first and second supports respectively extend about associated driver and idler wheels mounted in the assembly at or towards opposite ends of the operative and inoperative runs of the spacial path and the driven and idler wheels at respective ends of the operative and inoperative runs of the spacial path are arranged on coincident axes or substantially so.

Conveniently the carrier elements are provided by endless chains and the driver and idler wheels therefor by sprockets.

The collator assembly described hereinbefore may also be provided with infeed means operative, when the assembly is in use, to deliver articles seriatim to the first or second supports located at or below the upstream end of said operative run whereby, when the assembly is use, a stack of such articles is formed on said support as aforesaid and preferably the infeed means comprises primary and secondary infeed devices, the primary infeed device being effective, when the assembly is in use, in feeding a continuous column of articles seriatim towards the secondary infeed device whereat, when the assembly is in use, a spaced array of such articles is marshalled above said first or second supports for subsequent deposition onto said supports or onto preceding articles supported on said supports.

In a preferred embodiment provided by the invention the primary infeed device comprises an infeed conveyor and an article velocity control means for controlling, when the assembly is in use, the velocity at which an article approaches the collator, the velocity control means comprising article engaging wheels which, when the assembly is in use, grippingly engage the articles fed thereto by the primary conveyor to adjust the velocity of the articles thereby reducing or eliminating any impact loads suffered by the articles on reaching the secondary infeed device of the collator assembly.

Conveniently the secondary infeed device comprises a spaced array of article supporting shelves arranged for movement in associated pairs, one shelf of each pair of shelves being on opposite sides of said spacial path whereby, when the assembly is in use, and drive means associated with the secondary infeed device is in a drive mode, articles fed to the secondary infeed device are marshalled in a spaced array above said first or second supports for subsequent deposition onto said supports or onto preceding articles supported on said supports as aforesaid.

Advantageously the collator assembly described herein comprises means for synchronising the operation of: a) the drive means for the infeed conveyor, b) the article velocity control means, c) the secondary infeed device, and d) the first and second supports whereby, when the assembly is in use and articles are fed seriatim by the infeed conveyor to the article velocity control means leading ones of said articles may be temporarily estopped from approaching and entering said secondary infeed device to enable the first or second support to be moved by its respective drive means along said spacial path and between the spaced array of article supporting shelves thereby enabling said first and second supports to move successively into an operative position at an upstream end of said operative run of the spacial path.

The invention also provides a conveyer assembly for conveying articles to an appropriate receptor whereat, when the conveyor assembly is in use, the articles are received under "no-load" or substantially "no-load" as herein defined, said assembly comprising a conveyor run along which, when the assembly is in use a continuous column of articles is conveyed seriatim at a constant velocity or substantially so, the assembly also comprising an article accelerator-decelerator mechanism which, when the assembly is in use and articles are being fed along the conveyer run thereof, causes successive articles at a head of the column to be accelerated away from the remaining articles in the column thereby creating a gap therebetween, said articles thereafter being decelerated by said mechanism to enable the reception thereof onto any appropriate receptor under "no-load" or substantially "no-load" as aforesaid.

Preferably the accelerator-decelerator mechanism of the preceding paragraph comprises means downstream of said conveyer run to engage successive articles, when the conveyor assembly is in use, to accelerate successive articles away from the remaining articles in the column and to thereafter decelerate successive articles to enable their reception onto any appropriate receptor as aforesaid, said means to engage said articles comprising at least two opposed pairs of rotatable drive wheels.

The present invention further provides a conveyor assembly comprising a first conveyer run along which, when the assembly is in use, a continuous column of articles may be conveyed seriatim at a constant velocity or substantially so, the assembly also comprising a spacing mechanism comprised of pairs of opposed drive wheels whereby successive articles at the head of said column may be accelerated away from the remaining articles of the column to be spaced therefrom when the assembly is in use, characterised in that, the assembly also comprises deceleration means for reducing the velocity of the accelerated articles to facilitate the reception thereof onto an appropriate receptor under "no-load" or substantially "no-load" conditions as herein defined.

The present invention also conveniently provides a collator assembly for use in forming stacks of roof tiles, said assembly comprising a collator having a plurality of supports and drive means associated with said supports respectively for moving said supports, when the assembly is in use, in turn through a common closed loop comprising an operative run at an upstream end of which, when the assembly is in use, roof tiles are fed seriatim to the collator to form a stack of such tiles on the supports in turn, the closed loop also comprising an inoperative run through which, when the assembly is in use, the supports, having successively had a stack of roof tiles removed therefrom at a downstream end of said operative run, are each thereafter successively moved by the drive means at a selected rate commensurate with returning a successive one of said supports to the upstream end of the operative run as a preceding one of said supports, having passed through said operative run, approaches the downstream end thereof.

Preferably the present invention provides a collator assembly adapted for use in forming stacks of articles as hereinbefore defined, said assembly comprising a collator having a plurality of supports and drive means associated with said supports respectively for moving said supports, when the assembly is in use, in turn through a common closed loop comprising an operative run at an upstream end of which, when the assembly is in use, articles are fed seriatim to the collator to form a stack of such articles on the supports in turn, the closed loop also comprising an inoperative run through which, when the assembly is in use, the supports, having successively had a stack of articles removed therefrom at a downstream end of said operative run, are thereafter successively moved by the drive means at selected rates commensurate with returning a successive one of said supports to the upstream end of the operative run as a preceding one of said supports, having passed through said operative run, approaches the downstream end thereof.

There now follows by way of example a detailed description of a collator assembly and a conveyor assembly adapted for use therewith, which description is to be read with reference to the accompanying drawings in which.

Difficulties met hitherto in forming stacks of cured concrete roof tiles free of incidental damage are overcome by the "no-load" or substantially "no-load" conditions exerted upon the cured concrete roof tiles by the novel collator assembly provided by the present invention.

Figure 1:
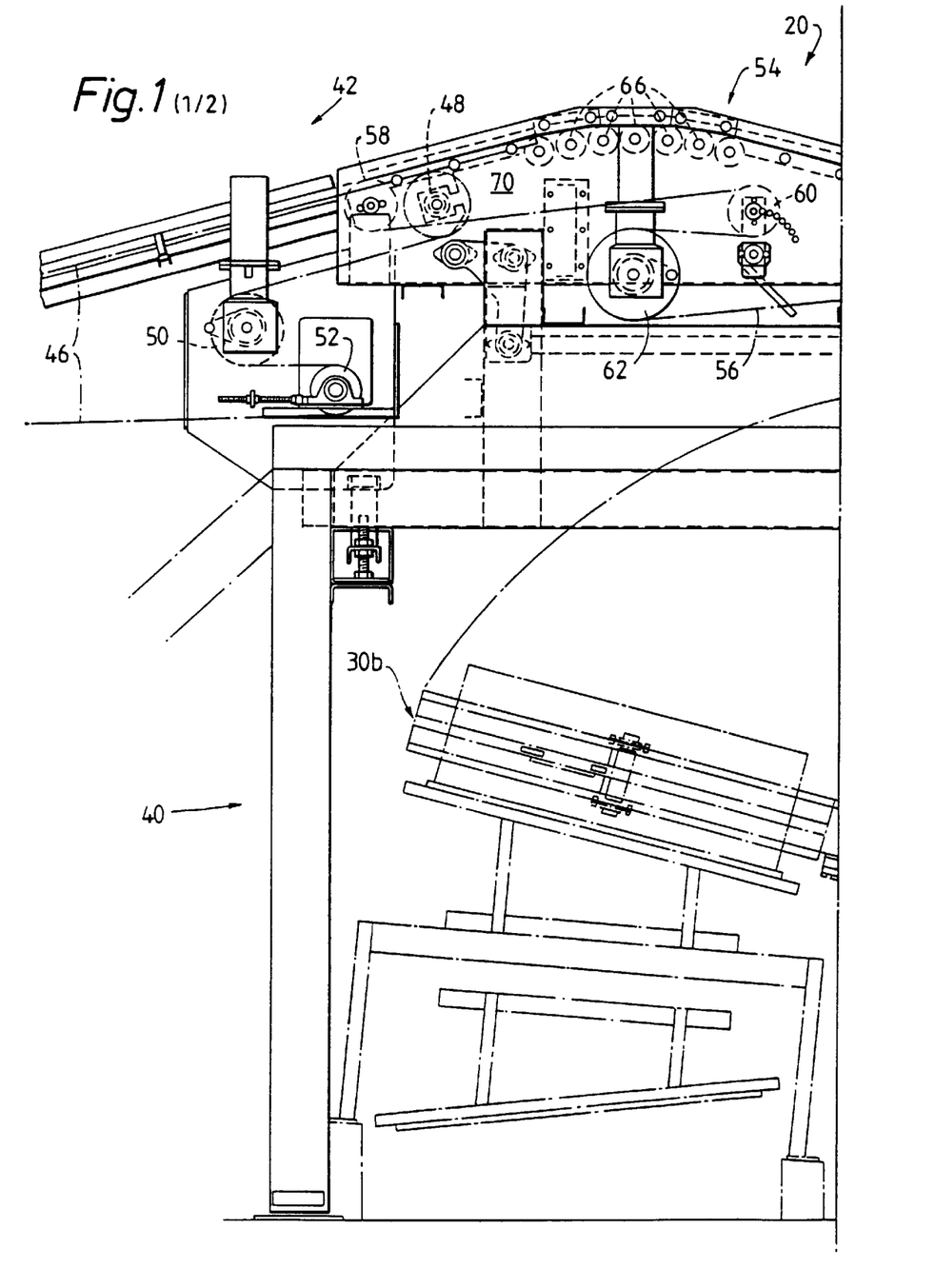
FIG. 1 is a side view of a collator assembly.

The collator assembly, which is designated 10 in FIG. 1, generally comprises a primary infeed device 20 for feeding concrete roof tiles T seriatim, a secondary infeed device 22 for arranging tiles fed thereto in a spaced array, a stack forming means 24 including two supports 26 and 28, see FIGS. 5, 7 and 11 to 14, on which stacks of tiles T are formed, a stack clamping device 30 for removing a stack of tiles T formed on said supports, and, a synchronising means (not shown) for ensuring the accurate sequencing of the various drive means for the assembly 10.

The collator assembly 10 is supported in and on a floor mounted fabricated mainframe 40, see FIG. 1, and supported over a large portion of its length is the primary infeed device 20 which comprises an infeed polycord conveyor 42 of conventional design. Thus the conveyor 42 comprises twin cords 46 which pass over associated pairs of wheels 48, 50 and 52 rotatably mounted at a left hand end portion of the mainframe 40, see FIG. 1, it being appreciated that only one each of the pairs of wheels 48, 50 and 52 is shown in said drawing.

Downstream of said conveyor 42, the primary infeed device 20 also comprises a polycord conveyor 54 twin cords 56 of which pass over associated pairs of wheels 58,60,62, 64, and rolls 66. The wheels 60 and 62 form part of a polycord tensioning means also of conventional design. All of the wheels 58,60,62 and 64, only one of each pair being shown in FIG. 1, and the rolls 66 are rotatably mounted on a subframe 70 of the mainframe 40 as shown in FIG. 1.

The primary infeed device 20 also comprises velocity control means 72 located on a subframe 74 of the mainframe 40 downstream of the conveyor 54 as shown in FIG. 1. The means 72, see especially FIGS. 2, 3 and 4 comprises opposed pairs of idler rolls 80,82,84 and 86 and two opposed pairs of driven rolls 88 and 90 between which, when the assembly is in use, tiles T fed seriatim thereto by the conveyors 44 and 54, are thereafter fed at a controlled rate to the secondary infeed device 22 as will be described more fully hereafter. The idler rolls 80,82,84 and 86 are mounted on simple bearing blocks 96 adjustably mounted on said subframe 74, see FIGS. 2 and 4.

Figure 2:
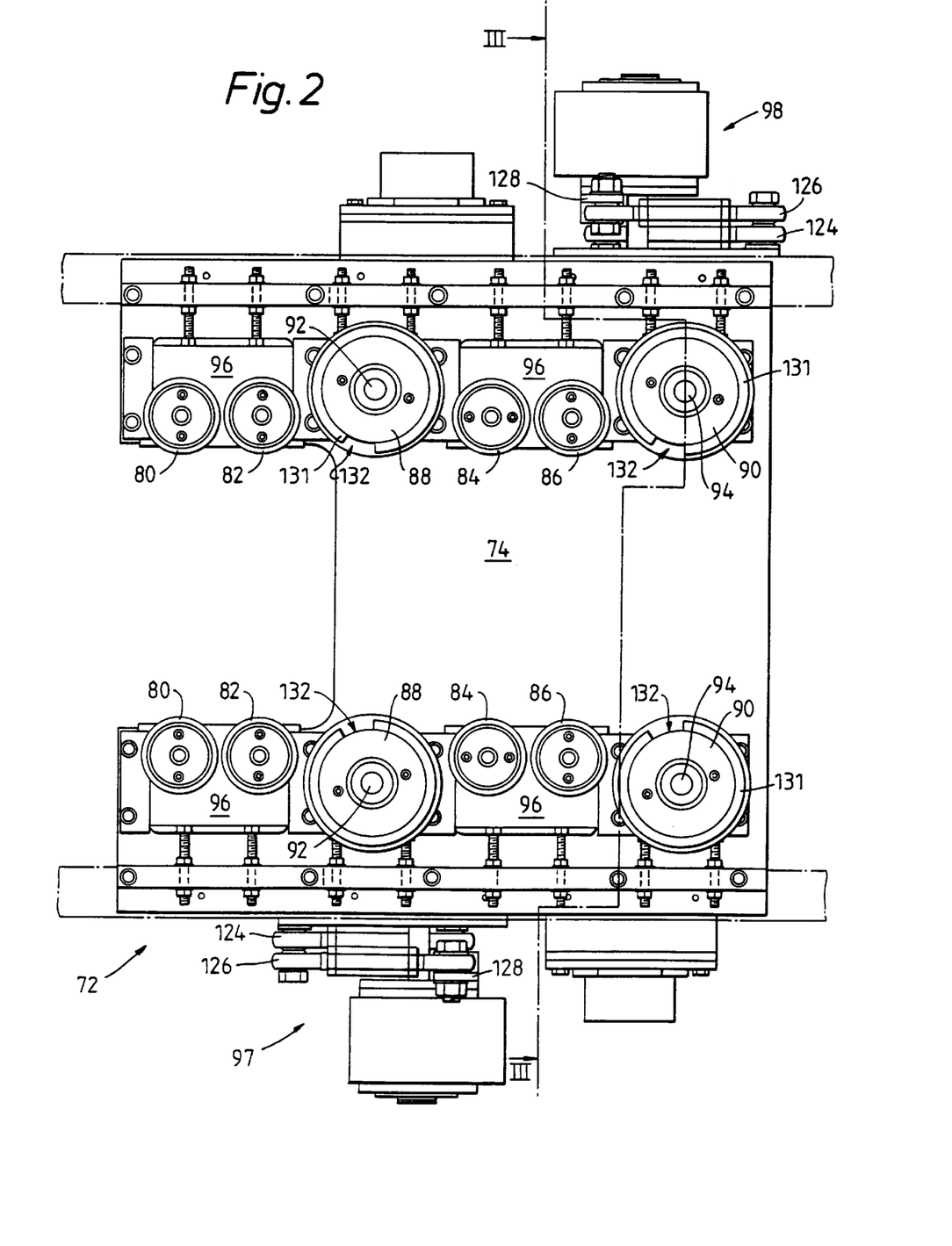
FIG. 2 is a partial plan view in the direction of arrow II of FIG. 1.
Figure 3:
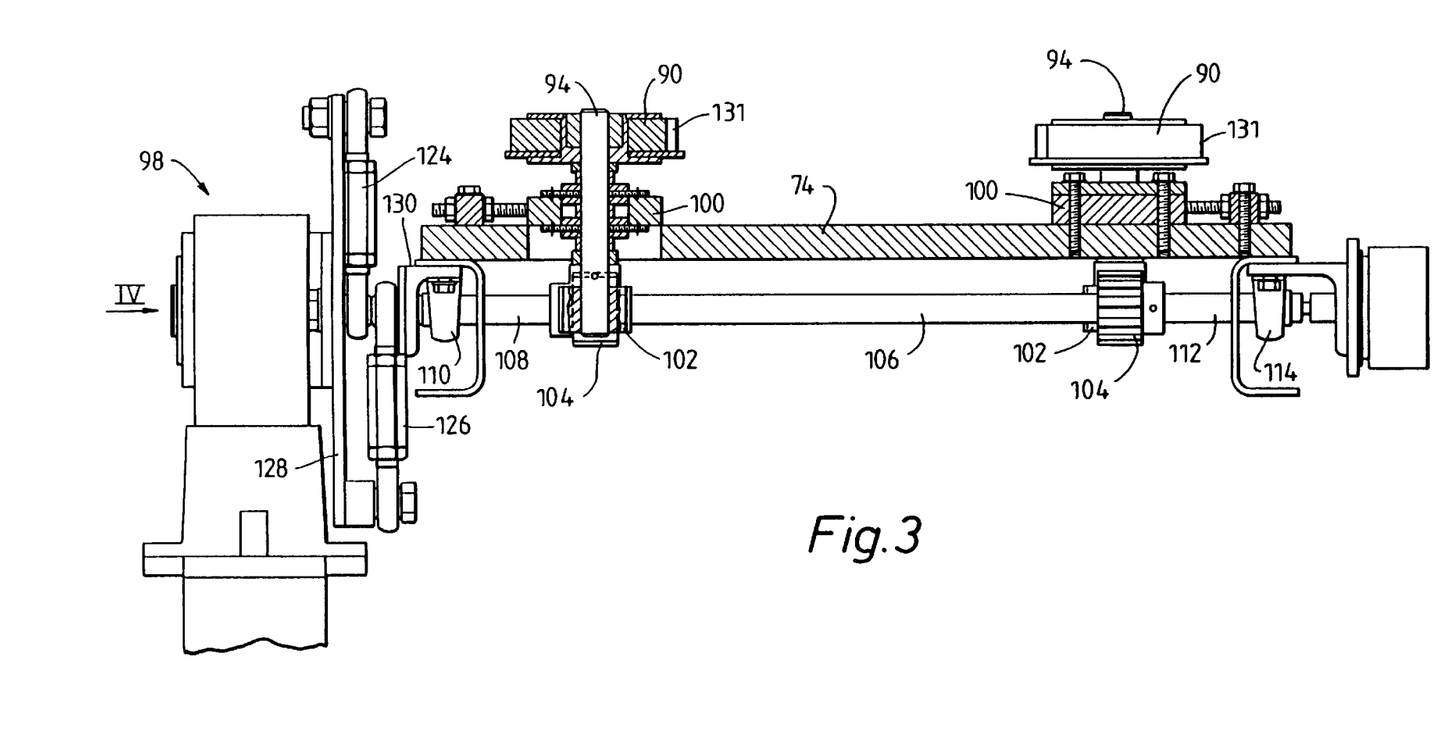
FIG. 3 is a section view taken generally along the line III—III of FIG. 2.
Figure 4:
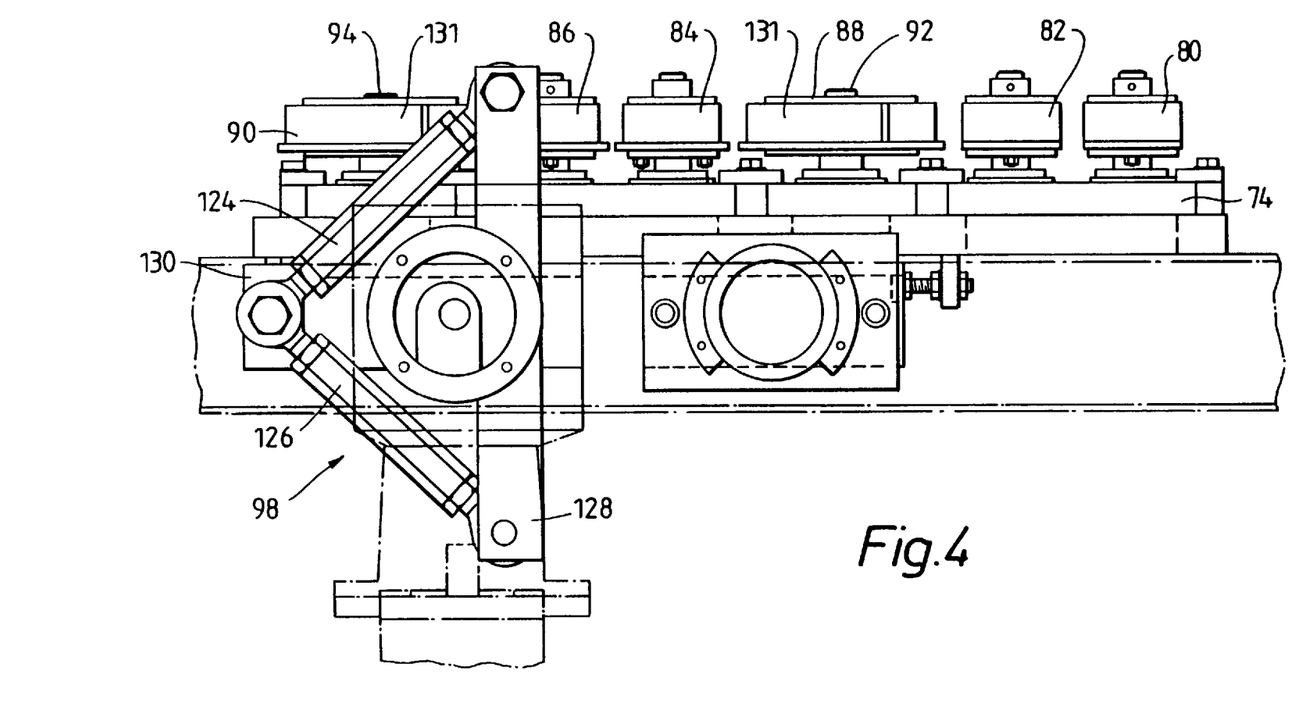
FIG. 4 is a partial side view taken generally in the direction of arrow IV of FIG. 3.

The driven rolls 88 and 90 are each similarly mounted on associated spindles 92 and 94 respectively and are similarly connected through appropriate gears, etc. to associated drive means 97 and 98 respectively as shown in FIG. 2, 3 and 4. However, only the details of the connection between the rolls 90, their spindles 94 and the drive means 98 will now be particularly described with reference to FIGS. 2 and 3 with the like parts of the connection between the rolls 88, their spindles 90 and the drive means 97 being accorded like reference characters.

Thus, the spindles 94, each of which is mounted in a bearing 100 and extends through the subframe 74, provide support for an associated worm gear 102. The worm gears 102 are arranged in meshing engagement with like worm gears 104 provided on a drive shaft 106. The shaft 106 extends beneath the subframe 74, as shown in FIG. 3, and has a left hand end 108 thereof supported by a bearing bracket 110 and a right hand end 112 therof supported by a bearing bracket 114.

The left hand end 108 of the shaft 106 is connected to the drive means 98 as shown in FIGS. 3 and 4, which drive means 98 is also connected to the subframe 74 via torsion elements 124,126 connected between a bracket 128 of said drive means 98 and a bracket 130 secured to an underside of the subframe 74 as shown in FIGS. 3 and 4.

For engaging with the tiles T, the opposite pairs of driven rolls 88 and 90 are each provided with gapped compression pads 131 extending for some 3300 about the periphery of the rolls 88 and 90 as shown in FIG. 2. The purpose of the pads 131 and the gaps 132 provided therein will be made clear hereinafter.

Figure 5:
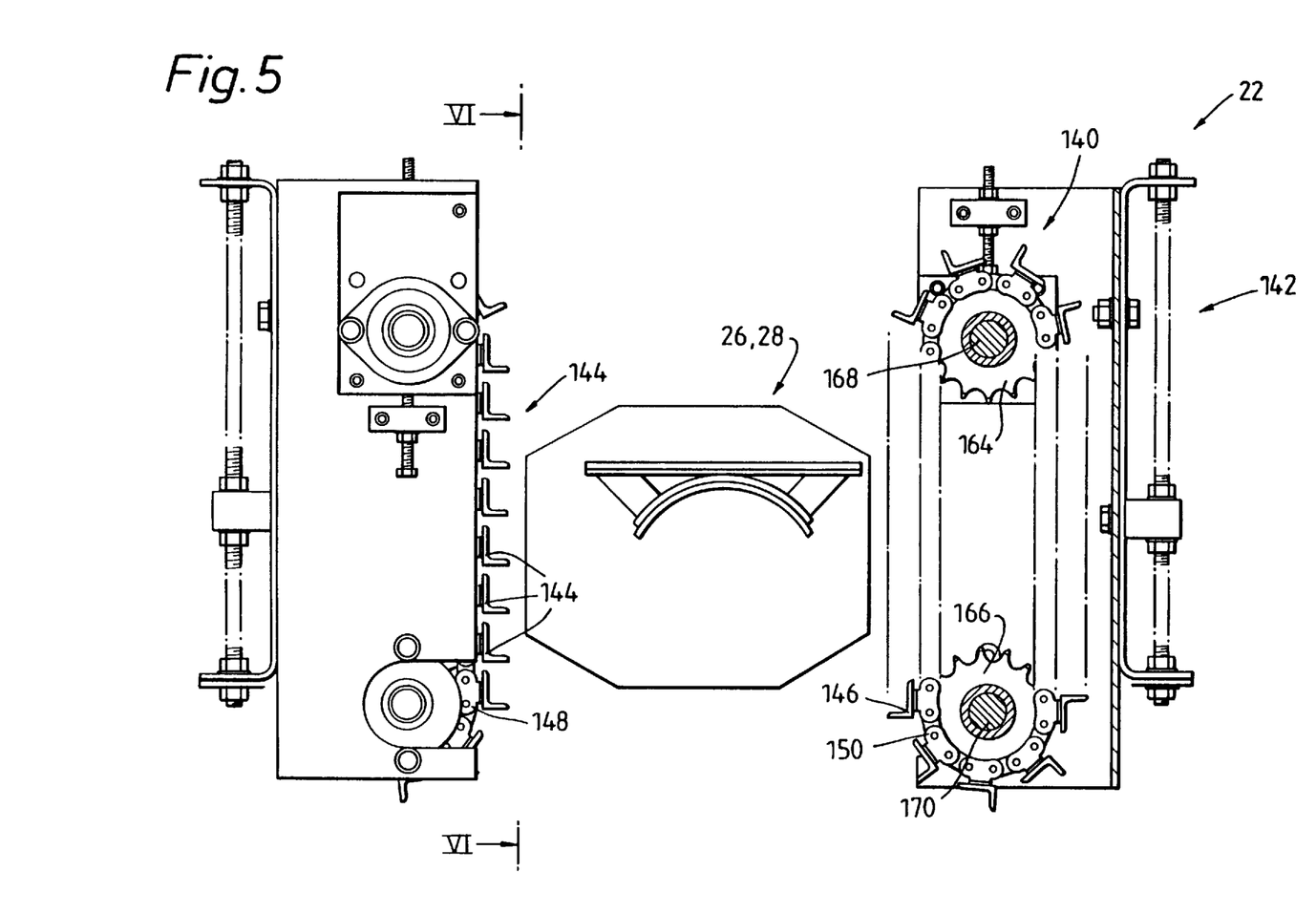
FIG. 5 is a view taken generally in the direction of the arrow V of FIG. 1.
Figure 6:
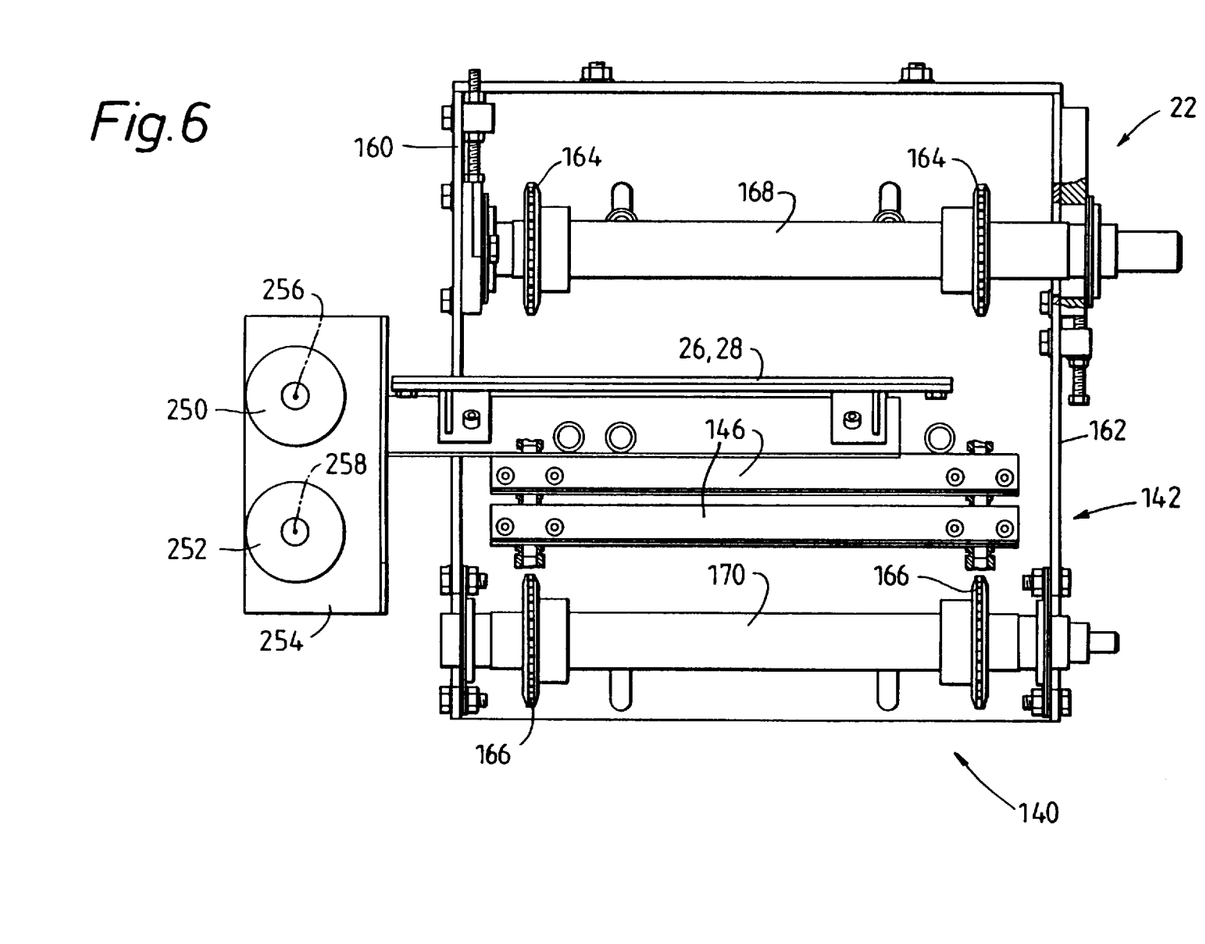
FIG. 6 is a view taken generally along the line VI—VI of FIG. 5.
Figure 7:
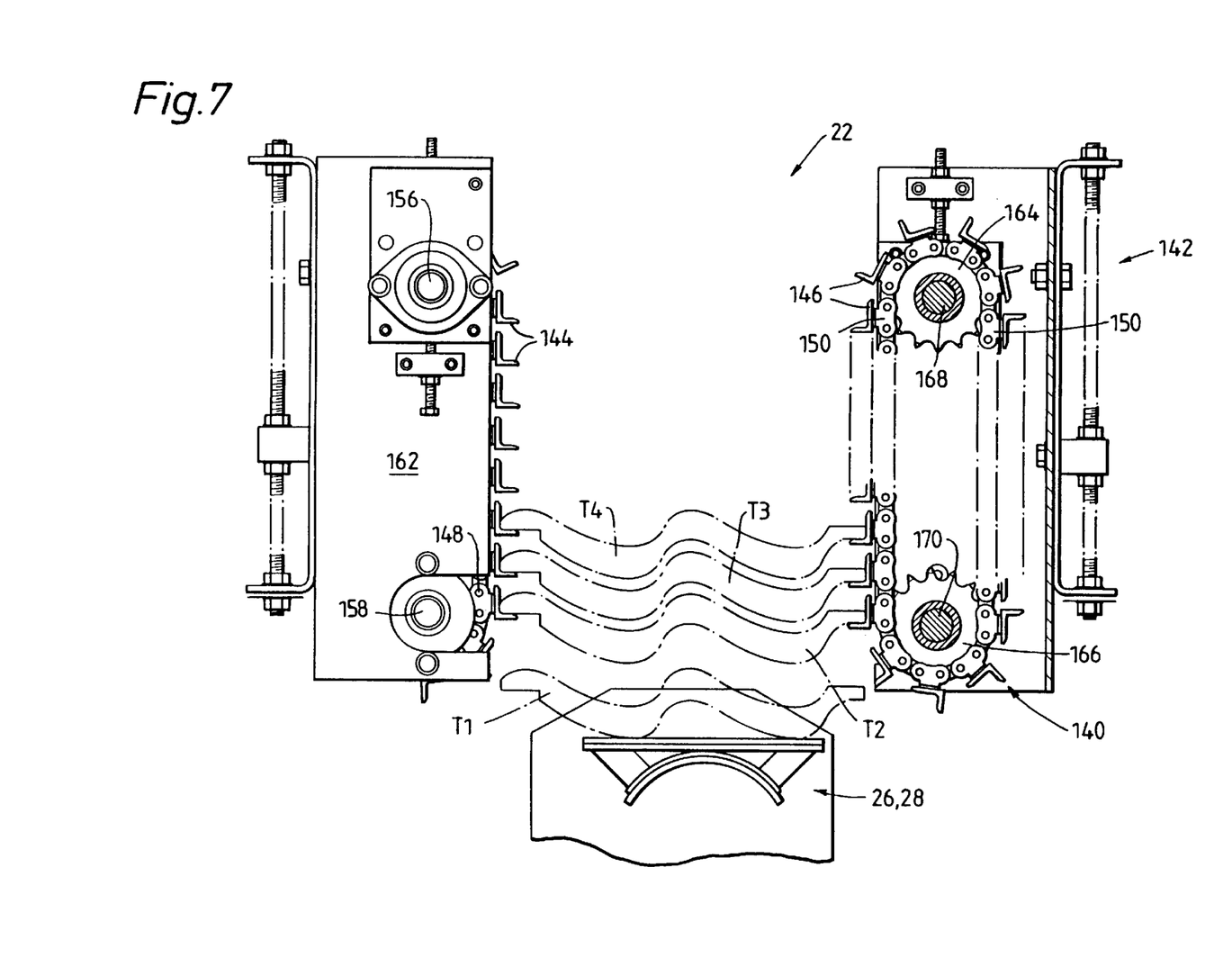
FIG. 7 is a view corresponding to FIG. 5 but with parts thereof shown in their positions at a later stage in an operative cycle of the collator assembly.

The secondary infeed device 22, see FIGS. 5, 6 and 7 comprises a conventional falling shelf conveyor 140 supported on a subframe 142 of the mainframe 40, see FIG. 1. Thus the conveyor 140 comprises opposed pairs of shelves 144,146 carried by associated pairs of drive chains 148 and 150 respectively, see FIGS. 5 and 7.

The chains 148 are mounted on upper and lower sprockets, not shown, which are in turn mounted on drive and driven shafts 156 and 158 respectively journalled in rearward and forward walls 160 and 162 of the subframe 142, see FIGS. 5 and 6.

Likewise, the chains 150 are mounted on upper and lower sprockets 164 and 166 which are in turn mounted on drive and driven shafts 168 and 170 respectively journalled in the rearward and forward wall 160 and 162 of the subframe 142, see FIG. 6.

The drive shafts 156 and 168 are interconnected by appropriate means, not shown, whereby drive means 172 mounted on the subframe 142 and connected to the shaft 156 causes, when the collator assembly 10 is in use, downward movement of the shelves 144 and 146 to be fully described hereinafter.

The stack forming means 24 is mounted between upper and lower subframes 180 and 182 respectively of the mainframe 40; see FIG. 1.

Figure 8:
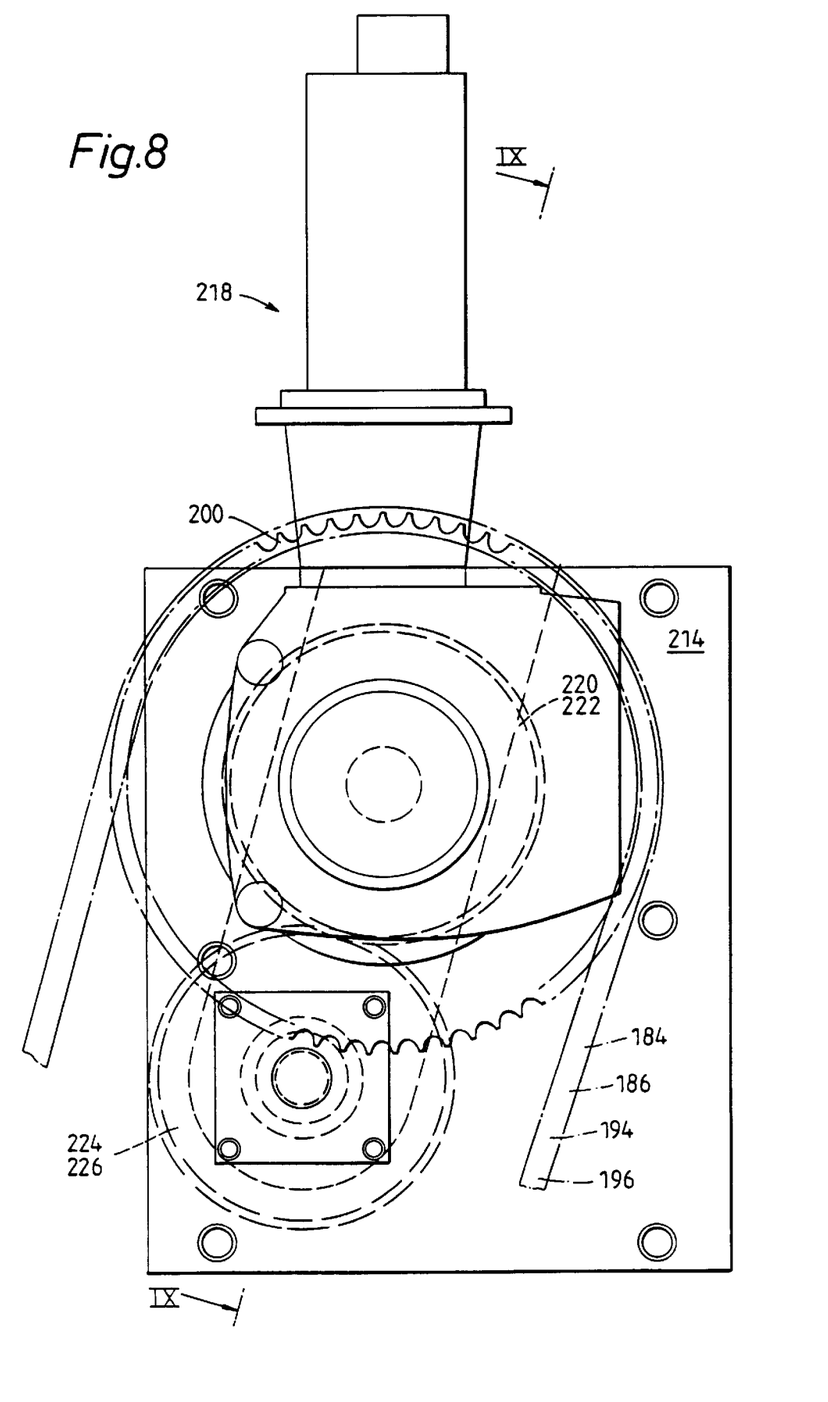
FIG. 8 is an enlarged side view of some of the parts shown in FIG. 1.
Figure 9:
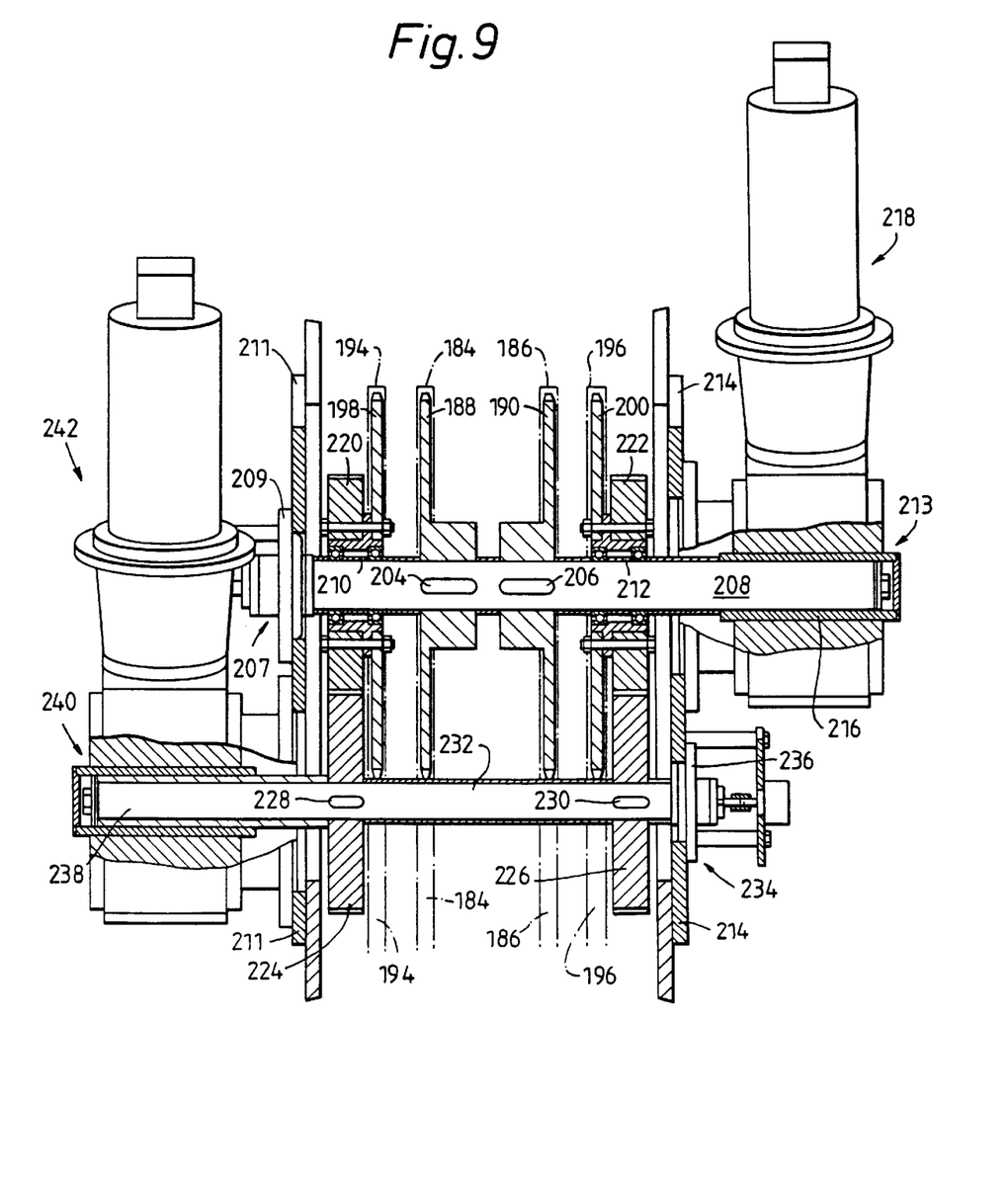
FIG. 9 is a sectional view generally along the line IX—IX of FIG. 8.

The means 24 comprises a first pair of endless chains 184 and 186 for carrying the support 26, the chains 184 and 186 being mounted on upper sprockets 188 and 190 respectively and aligned lower sprockets, not shown, see FIGS. 1, 8 and 9.

The means 24 also comprises a second pair of endless chains 194 and 196 for carrying the support 28, the chains 194 and 196 being mounted on upper sprockets 198 and 200 respectively and aligned lower sprockets only one of which is shown at 202 in FIG. 1.

As shown in FIG. 9, the sprockets 188 and 190 are keyed at 204 and 206 respectively to a drive shaft 208; however, the sprockets 198 and 200 are freely rotatable on respective bearings 210 and 212 also mounted on the shaft 208.

The shaft 208, which is journalled at its left hand end 207 in bearing 209 secured to a wall 211 of the subframe 180, has a right hand end 213 thereof which extends through a side wall 214 of the subframe 180, see FIG. 9 to mesh with a spindle drive 216 of drive means 218. Thus, when the collator assembly 10 is in use, the drive means 218 is effective through the splined drive 216, the shaft 208, the keyed sprockets 188 and 190 to drive the chains 184 and 186 and thus the support 26.

Also as shown in FIG. 9, the sprockets 198 and 200 are provided with concentric gear wheels 220 and 222 respectively which are arranged in meshing engagement with gear wheels 224 and 226 respectively which are in turn keyed at 228 and 230 respectively to a drive shaft 232, see FIGS. 1, 8 and 9.

The shaft 232, which is journalled at its right hand end 234 in a bearing 236 secured to the side wall 214 of the subframe 180, has a left hand end 238 thereof which extends through the side wall 211 of the subframe 180, see FIG. 9, to mesh with a splined drive 240 of drive means 242. Thus, when the collator assembly 10 is in use the drive means 242 is effective through the splined drive 240, the shaft 232, the keyed gear wheels 224 and 226, the gear wheels 220 and 222 and the sprockets 198 and 200 to drive the chains 194 and 196 and thus the support 28.

Figure 11:
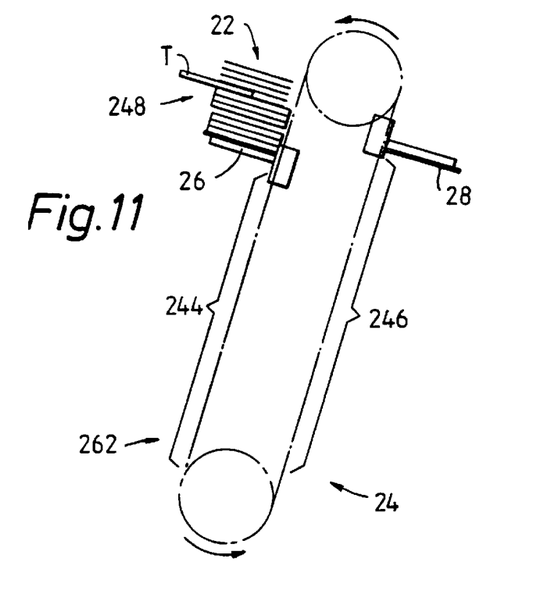
Figure 12:
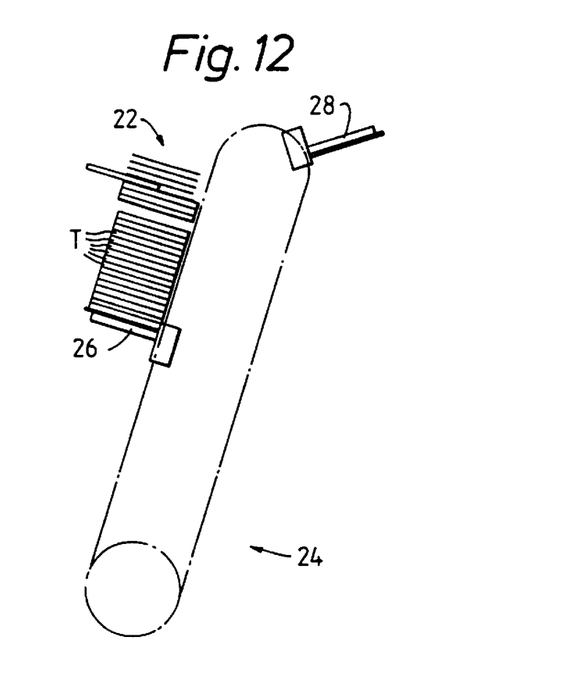
Figure 13:
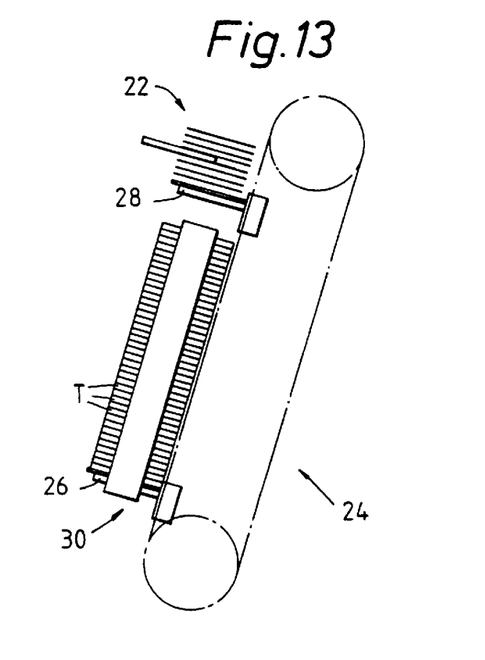
Figure 14:
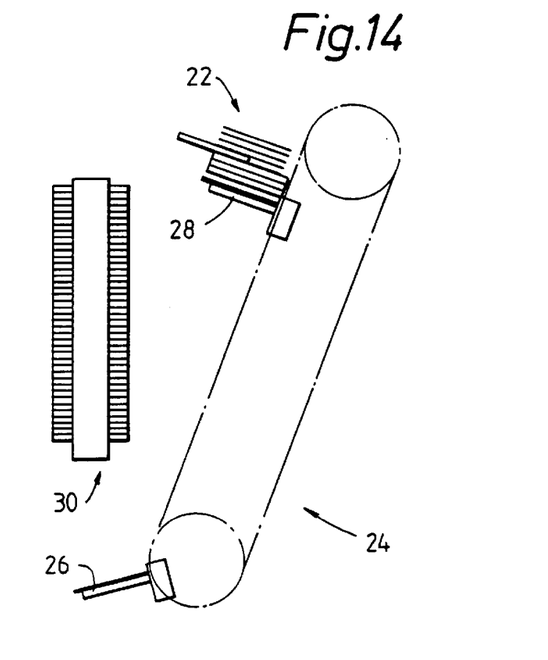

By the arrangement just described, when the collator assembly 10 is in use, the supports 26 and 28 are independently supported for sequential movement through the same closed loop path which comprises an operative run 244 whereat stacks of tiles T are formed and an inoperative run 246 through which the supports 26 and 28 pass at a rate commensurate with either one thereof being returned to an upstream end 248 of the operative run 244 as the other one thereof reaches a downstream end 262 of the operative run 244, see FIG. 11.

The supports 26 and 28 of the stack forming means 24 are each provided with roll elements 250 and 252 on rearwardly projecting bracket members 254, see especially FIGS. 1 and 6, there being two such rolls 250 and 252 arranged on coincident axes 256 and 258 respectively, see FIG. 6.

The stack forming means 24 also comprises adjacent the operative run 244 herein defined, guide rails 260, only one of which is shown in chain dot lines in FIG. 1, which rails 260 are engaged by the rolls 250 and 252 to hold the supports firmly against rearward movement, i.e. to the right viewing FIG. 1 or to the left viewing FIG. 6, when the collator assembly 10 is in use.

The stack forming means 24 further comprises pairs of upper and lower stack guide elements 270 and 272 only one of each being shown in FIG. 1. The pairs of guide elements 270 and 272 extend between and are mounted on the upper and lower subframes 180 and 182 to straddle the operative run 244 of the supports 26 and 28 to give sidewise support to the stacks of tiles T formed thereon when the collator assembly is in use.

The stack clamping device 30 is of conventional design and will not be described herein in detail. Suffice to say that the device 30 is pivotally mounted on the subframe 182 for movement between a loading position shown in ghost-line 30a in which clamps thereof straddle a stack of tiles T, and an unloading position 30b, see FIG. 1.

When the collator assembly 10 of the present invention is in use tiles T are fed seriation in spaced relationship or juxtaposed end to end along the conveyor 42 to the conveyor 54 and thus to the velocity control means 72.

A first tile T1 approaching the means 72 is engaged by the opposed pairs of idler rolls 80 and 82 and then by the opposed pair of driven rolls 88.

Figure 10A:
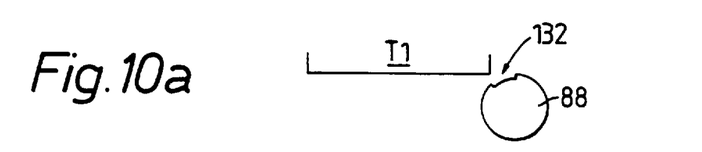
FIGS. 10a to 10j are diagrammatic representations of parts of an infeed means at progressive stages in a cycle of operation thereof; and, FIGS. 11 to 14 are diagrammatic representations of parts of the collator assembly of FIG. 1 at progressive stages in a cycle of operation thereof.
Figure 10B:
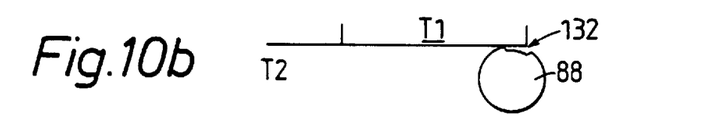
Figure 10C:
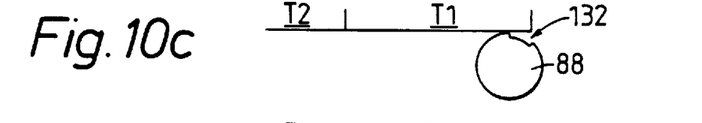
Figure 10D:
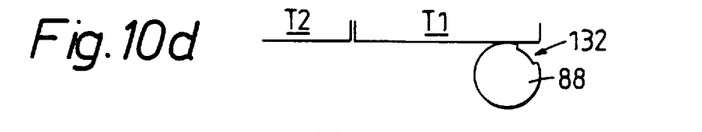

As described herein the rolls 88 are provided with gapped resilient pads 131 extending peripherally thereabout, and the gaps 132 in the pads 131, are positioned so that opposite leading edges of the tile T1 enter the gaps 132, see FIGS. 10a and 10b, thereby facilitating the interengagement between the rolls 88 and the tile T1.

The rolls 88 are driven at a higher peripheral speed than the linear speed of the tile T1 in order to accelerate the tile T1 away from a following tile T2, see FIGS. 10c, 10d, 10e and 10f.

Figure 10E:
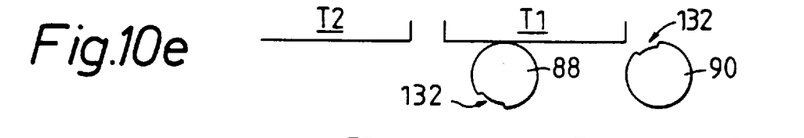
Figure 10F:
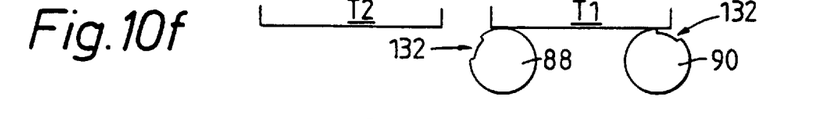
Figure 10G:
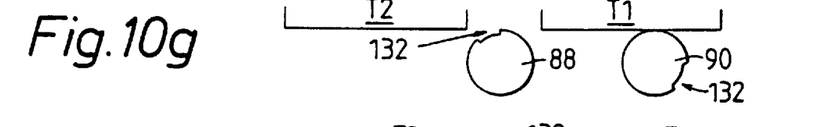

As shown in FIGS. 10e and 10f, the opposite leading edges of the tile T1 approach and enter the gaps 132 of the opposed driven rolls 90. Thus the tile T1 is spaced from the tile T2 whose opposite leading edges now approach and enter the gaps 132 of the rolls 88 as shown in FIGS. 10g, 10h and 10i.

Figures 10H, 10I:
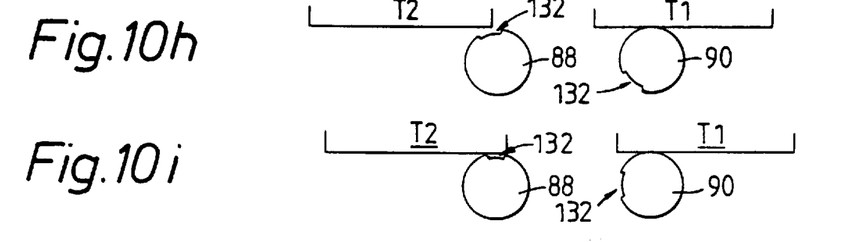
Figure 10J:
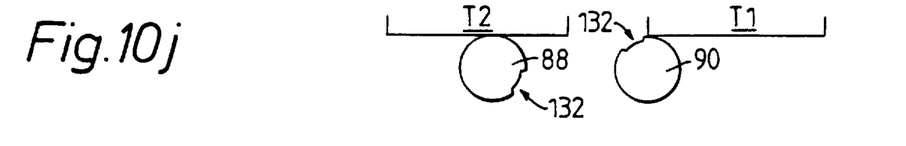

At this time the rate of progress of the tile T1 is being retarded by the opposed driven rolls 90, see FIGS. 10i and 10j where it is evident that the tile T2 is catching up with the tile T1; however, at this time the tile T1 has exited the velocity control means 72 and has been received on a pair of shelves 144, 146 of the secondary infeed means 22 next above the support 26 or 28 at the position shown in FIG. 6.

Successive tiles T1 to T40 are fed by the conveyors 42 and 54 and the velocity control means 72 to an upstream end of an operative run 244 of the spacial path, as hereinbefore defined, where the tiles are received by the secondary infeed means 22 under "no-load" or substantially "no-load" conditions thereby reducing the incidence of damaged tiles, the tiles being stacked on the shelves 144,146 of the means 22 in a spaced array.

As the successive tiles T1 to T40 are fed to the secondary infeed means 22, the drive means 172 is operated to cause the shelves 144,146 to be lowered to cause deposition of successive lowermost tiles of the spaced arrays onto the support 26 or 28 or onto preceding tiles supported on said support 26 or 28, the tiles once again being deposited under "no-load" or substantially "no-load" conditions thereby preventing undue damage to the tiles, see FIG. 11. In order to facilitate the deposition of the tiles T1 to T40 as aforesaid, the support 26 or 28 is also lowered by operation of the respective drive means 218 or 242 in a timed relationship with the rate at which the shelves 144,146 are lowered to facilitate the formation of a stack of tiles on the support 26 or 28 as It is moved through the operative run 244 of the spacial path, the stack of tiles being 40 tiles high by the time the support 26 or 28 reaches the downstream end 262 of said operative run 244, see FIG. 13.

When the stack of tiles is complete the stack clamping device 30 is operated to secure the stack between clamp arms thereof in the position 30a of FIG. 1. Thereafter, the clamp 30 is pivoted anti-clockwise, viewing FIGS. 1 and 14, into a position 30b in FIG. 1 in which the stack of tiles T1 to T40 is released onto a packaging table or the like.

As the stack of tiles is completed on the support 26 or 28 and the support reaches the downstream end 262 of the operative run 244, the other of the two supports 26 or 28 approaches and enters into an operative position at an upstream end 248 of said operative run 244, i.e. the support 26 or 28 takes up the position as shown in FIGS. 5 and 6.

It is evident from the foregoing that the drive means 218 or 242 will be caused to operate at a rate commensurate with ensuring the passage of the support 26 or 28 about their respective sprockets at the downstream end 262 of said operative run 244, along the inoperative run 246 and about their respective sprockets 188,190 or 198,200 to bring the support 26 or 28 into its operative position at the upstream end 248 of the operative run 244 as the other of the two supports with a stack of tiles formed thereupon reaches the downstream end of said operative run.

The operation of the velocity control means 72 has been described in relation to feeding tiles seriation to the secondary infeed means 22; however, the means 72 has a further operative mode which is effected after the delivery thereby of the 40th tile to the secondary infeed means 22 and as the support 26 or 28 is approaching the upstream end 248 of the operative run 244 of the stack forming means 24.

In its further operative mode, the rotational speeds of the rolls 88 and 90 are controlled to prevent a tile from entering the shelves 144 of the means 22 thereby to allow the downward passage of the support 26 or 28 between the shelves 144,146 to take up its operative position as shown in FIGS. 5 and 6.

It will also be evident that the operations of the various drive means of the collator assembly are closely synchronised in order to achieve the most advantageous use of the invention.

Whereas the collator assembly 10 and specifically the stack forming means 24 has been set up to form stacks containing 40 tiles, in other arrangements any requisite numbers of tiles may be formed into stacks.

Modifications which may be made within the scope of the present invention include a collator assembly in which the stack forming means has more than two supports on which stacks of tiles are formed, for example, in an arrangement where the stacks are of 10 tiles, there may be four supports arranged two each on associated pairs of the endless chains.

It will be appreciated that the compact nature of the novel collator arrangement herein described may be utilised with established tile plant where space is at a premium.

Other modifications may be made within the scope of the present invention.

We claim:

1. A conveyor-collator assembly comprising a stack forming means (24) for use in forming stacks of articles (T), said stack forming means (24) having a plurality of supports (26,28) on each of which, when the assembly is in use, successive stacks of articles (T) are formed, the assembly also comprising conveyor means (42) for feeding articles (T) seriatim to the stack-forming means (24), the assembly further comprising an infeed means (20,22) for feeding articles (T) from said conveyor means (42) to said stack forming means (24) characterised in that, when the assembly is in use, and articles (T) have been fed to the stack forming means (24) by the infeed means (20,22) under "no load" or "substantially no load" conditions, the supports (26,28) are moved in turn through the same spacial path by drive means (218,242), the drive means (218,242) comprises at least one endless carrier element for each of the supports (26,28), respectively the spacial path comprising an operative run (244) at an upstream end (248) of which, when the assembly is in use, articles (T) are fed seriatim to the stack forming means (24) to form a stack of such articles (T) on the supports (26,28) in turn, the spacial path also comprising an inoperative run (246) through which, when the assembly is in use, the supports (26,28), having successively had a stack of articles removed therefrom at a downstream end (262) of said operative run (244), are thereafter successively moved by the drive means (218,242) at a rate commensurate with returning each support (26,28) successively to the upstream end (248) of the operative run (244) as a preceding support (26,28) having passed through said operative run (244), approaches the downstream end (262) thereof, each of said carrier elements extending about associated driven (188, 190,198,200) and idler wheels mounted in the assembly at or towards opposite ends of the operative and inoperative runs (244,246), respectively, of the spacial path, said driven and idler wheels at respective ends of the operative and inoperative runs (244,246) of the spacial path are arranged on coincident axes (208) or substantially so.

2. An assembly according to claim 1 characterised in that the stack forming means 24 comprises two supports (26,28) on each of which, in turn, when the assembly is in use, successive stacks of articles (T) are formed.

3. An assembly according to any one of claim 1 characterised in that the assembly is adapted for use in forming stacks of concrete roof tiles (T).

4. An assembly according to claim 1 characterised in that the drive means (218,242) comprises two endless carrier elements (184,186,194,196) for each of the supports (26,28).

5. An assembly according to claim 4 characterised in that the infeed means comprises primary and secondary infeed devices, the primary infeed device (20) being effective, when the assembly is in use, in feeding a continuous column of articles (T) seriatim towards the secondary infeed device (22) whereat, when the assembly is in use, a spaced array of such articles is marshaled above one of the supports (26,28) for subsequent deposition onto one of said supports (26,28) or onto preceding articles (T) supported on one of said supports (26,28).

6. An assembly according to claim 1 characterised in that the carrier elements are provided by endless chains (184, 186,194,196) and the driven and idler wheels therefor by sprockets (188,190,198,200).

7. An assembly according to claim 6 characterised in that the infeed means comprises primary and secondary infeed devices, the primary infeed device (20) being effective, when the assembly is in use, in feeding a continuous column of articles (T) seriatim towards the secondary infeed device (22) whereat, when the assembly is in use, a spaced array of such articles is marshaled above one of the supports (26,28) for subsequent deposition onto one of said supports (26,28) or onto preceding articles (T) supported on one of said supports (26,28).

8. An assembly according to claim 5 characterised in that the primary infeed device (20) comprises an infeed conveyor (54) and an article velocity control means (72) for controlling, when the assembly is in use, the velocity at which an article (T) approaches the stack forming means (24).

9. An assembly according to claim 8 characterised in that the velocity control means (72) comprises article engaging wheels (58,60,62,64,66) which, when the assembly is in use, grippingly engage the articles (T) fed thereto by the primary conveyor (54) to adjust the velocity of the articles (T) thereby reducing or eliminating any impact loads suffered by the articles (T) on reaching the secondary infeed device (22) of the assembly.

10. An assembly according to claim 7 characterised in that the primary infeed device (20) comprises an infeed conveyor (54) and an article velocity control means (72) for controlling, when the assembly is in use, the velocity at which an article (T) approaches the stack forming means (24).

11. An assembly according to claim 10 characterised in that the velocity control means (72) comprises article engaging wheels (58,60,62,64,66) which, when the assembly is in use, grippingly engage the articles (T) fed thereto by the primary conveyor (54) to adjust the velocity of the articles (T) thereby reducing or eliminating any impact loads suffered by the articles (T) on reaching the secondary infeed device (22) of the assembly.

12. An assembly according to claim 1 characterised in that the infeed means comprises primary and secondary infeed devices, the primary infeed device (20) being effective, when the assembly is in use, in feeding a continuous column of articles (T) seriatim towards the secondary infeed device (22) whereat, when the assembly is in use, a spaced array of such articles is marshalled above one of the supports (26,28) for subsequent deposition onto one of said supports (26,28) or onto preceding articles (T) supported on one of said supports (26,28).

13. An assembly according to claim 12 wherein the secondary infeed device comprises a spaced array of article supporting shelves arranged for movement in associated pairs one shelf of each pair of shelves being on opposite sides of said spacial path whereby, when the assembly is in use, and drive means associated with the secondary infeed device is in a drive mode articles fed to the secondary infeed device are marshalled in a spaced array above said first or second supports for subsequent deposition onto said supports or onto preceding articles supported on said supports.

14. An assembly according to claim 13 characterised in that means are provided for synchronising the operation of: a) the drive means for the infeed conveyor (54), b) the article velocity control means (72), c) the secondary infeed device (22), and d) the supports (26,28) whereby, when the assembly is in use and articles (T) are fed seriatim by the infeed conveyor (54) to the article velocity control means (72), leading ones of said articles (T) may be temporarily stopped from approaching and entering said secondary infeed device (22) to enable a support (26,28) to be moved by its respective drive means along said spacial path and between the spaced array of article supporting shelves (144, 146) thereby enabling said next-in-line support (26,28) to move successively into an operative position at an upstream end (248) of said operative run (244) of the spacial path.

15. An assembly according to claim 12 characterised in that the primary infeed device (20) comprises an infeed conveyor (54) and an article velocity control means (72) for controlling, when the assembly is in use, the velocity at which an article (T) approaches the stack forming means (24).

16. An assembly according to claim 15 characterised in that the velocity control means (72) comprises article engaging wheels (58,60,62,64,66) which, when the assembly is in use, grippingly engage the articles (T) fed thereto by the infeed conveyor (54) to adjust the velocity of the articles (T) thereby reducing or eliminating any impact loads suffered by the articles (T) on reaching the secondary infeed device (22) of the assembly.

17. An assembly according to any one of claims 16 characterised in that the secondary infeed device (22) comprises a spaced array of article supporting shelves (144,146) arranged for movement in associated pairs one shelf of each pair of shelves being on opposite sides of said spacial path whereby, when the assembly is in use, and drive means (172) associated with the secondary infeed device (72) is in a drive mode articles (T) fed to the secondary infeed device (72) are marshalled in a spaced array above said supports (26,28) for subsequent deposition onto one of said supports (26,28) or onto preceding articles (T) supported on one of said supports (26,28).

18. An assembly according to claim 17 characterised in that means are provided for synchronising the operation of: a) the drive means for the infeed conveyor (54), b) the article velocity control means (72), c) the secondary infeed device (22), and d) the supports (26,28) whereby, when the assembly is in use and articles (T) are fed seriatim by the infeed conveyor (54) to the article velocity control means (72), leading ones of said articles (T) may be temporarily stopped from approaching and entering said secondary infeed device (22) to enable a support (26,28) to be moved by its respective drive means along said spacial path and between the spaced array of article supporting shelves (144,146) thereby enabling said next-in-line support (26,28) to move successively into an operative position at upstream end (248) of said operative run (244) of the spacial path.

19. An assembly according to claim 15 wherein the secondary infeed device comprises a spaced array of article supporting shelves arranged for movement in associated pairs one shelf of each pair of shelves being on opposite sides of said spacial path whereby, when the assembly is in use, and drive means associated with the secondary infeed device is in a drive mode articles fed to the secondary infeed device are marshalled in a spaced array above said first or second supports for subsequent deposition onto said supports or onto preceding articles supported on said supports.

20. An assembly according to claim 19 wherein means are provided for synchronising the operation of: a) the drive means for the infeed conveyor, b) the article velocity control means, c) the secondary infeed device, and d) the supports whereby, when the assembly is in use, and articles (T) are fed seriatim by the infeed conveyor to the article velocity control means, leading ones of said articles (T) may be temporarily stopped from approaching and entering said secondary infeed device to enable a support to be moved by its respective drive means along said spacial path and between the spaced array of article supporting shelves thereby enabling said next-in-line support to move successively into an operative position at an upstream end of said operative run of the spacial path.

* * * * *